US011755785B2

(12) United States Patent
Mienkina et al.

(10) Patent No.: US 11,755,785 B2
(45) Date of Patent: Sep. 12, 2023

(54) SYSTEM AND METHOD OF LIMITING ACCESS OF PROCESSORS TO HARDWARE RESOURCES (71) Applicant: NXP USA, Inc., Austin, TX (US)

(72) Inventors: Martin Mienkina, Bystrice Nad Olsi (CZ); Carl Culshaw, Wigan (GB); Larry Alan Woodrum, Austin, TX (US); David Eromosele, Munich (DE)

(73) Assignee: NXP USA, Inc., Austin, TX (US)

(*) Notice: Subject to any disclaimer, the term of this patent is extended or adjusted under 35 U.S.C. 154(b) by 528 days.

(21) Appl. No.: 16/983,694

(22) Filed: Aug. 3, 2020

(65) Prior Publication Data
US 2022/0035953 A1 Feb. 3, 2022

(51) Int. Cl.
G06F 21/70 (2013.01)
G06F 21/44 (2013.01)

(52) U.S. Cl.
CPC .............. G06F 21/70 (2013.01); G06F 21/44 (2013.01)

(58) Field of Classification Search
CPC ................................. G06F 21/70; G06F 21/44
See application file for complete search history.

(56) References Cited

U.S. PATENT DOCUMENTS

| 6,061,746 | A | * | 5/2000 | Stanley | G06F 13/387 |
| | | | | | 719/321 |
| 6,738,842 | B1 | * | 5/2004 | Bauer | G06F 15/177 |
| | | | | | 718/100 |
| 7,444,668 | B2 | | 10/2008 | Moyer et al. | |
| 7,512,724 | B1 | * | 3/2009 | Dennis | G06F 9/3885 |
| | | | | | 710/45 |
| 2010/0293304 | A1 | * | 11/2010 | Alexandron | G06F 13/28 |
| | | | | | 710/25 |
| 2011/0072172 | A1 | * | 3/2011 | Rodrigues | G06F 13/385 |
| | | | | | 710/305 |
| 2011/0161955 | A1 | | 6/2011 | Woller et al. | |
| 2015/0356039 | A1 | | 12/2015 | Kris | |
| 2017/0220489 | A1 | * | 8/2017 | Ahmed | G06F 12/1441 |
| 2018/0359117 | A1 | * | 12/2018 | Wietfeldt | G06F 13/4282 |

FOREIGN PATENT DOCUMENTS

| CN | 103778014 B | 5/2014 |
| CN | 108228333 A | 6/2018 |
| EP | 3296915 A | 3/2018 |

* cited by examiner

Primary Examiner — Saleh Najjar
Assistant Examiner — Devin E Almeida (57) ABSTRACT A processing system including processors, peripheral slots, hardware resources, and gateway circuitry. Each processor is assigned a corresponding identifier. The peripheral slots are located within an addressable peripheral space. Each hardware resource is placed into a corresponding peripheral slot, including at least one direct memory access (DMA) device supporting at least one DMA channel and at least one general-purpose input/output (GPIO) pin. Memory protection and gateway circuitry is programmed to control access of the hardware resources only by a processor that provides a matching identifier. The memories along with hardware resources are protected against unauthorized accesses to isolate applications executed on each processor within a multicore system and hence support freedom of interference.

18 Claims, 6 Drawing Sheets

SYSTEM AND METHOD OF LIMITING ACCESS OF PROCESSORS TO HARDWARE RESOURCES

BACKGROUND

Field of the Invention

The present invention relates in general to hardware resource assignment, and more particularly to system and method of limiting access of processors in a multiprocessor system to hardware resources.

Description of the Related Art

Conventional multiprocessor or multicore architectures provided limited protection of hardware resources. Hardware resources may include, for example, memory devices, various peripheral devices, general-purpose input/output (GPIO) pins, direct-memory access (DMA) devices, other non-core masters, etc. Some configurations included multiple DMA channels that were a shared resource. GPIO pins were not protected for accesses by unauthorized processors. The term "processor" as used herein may include any type of processing device, core, central processing unit (CPU), microcontroller, etc. The term "core" is often used for single core or multicore system-on-chip (SoC) architectures and the like.

Because the conventional architectures did not provide flexible protection of hardware resources, unwanted interference was a constant threat during operation. In the event of a runaway processor, even if ultimately terminated in an exception, the unrestrained processor may nonetheless interfere with the operation of other processors or associated applications in a harmful or even fatal manner. Such unwanted interference was typically directed at the hardware resources being used or controlled by another processor or non-core master.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

A multiprocessor architecture as described herein can assign hardware resources to each processor of a multiprocessor system either in a fixed manner, based on a major use-case, or by user assignment at boot time. Processor and hardware resource assignment may be facilitated by processor identifiers (PIDs) or domain identifiers (DID) or the like. The purpose of protecting hardware resources against unauthorized accesses is to isolate applications executed on each processor within a multiprocessor system to prevent unauthorized and harmful interference from other processors or devices. The architecture allows a user to assign not only memories and on-chip peripherals but also DMA channels and virtual pin groups each including one or more GPIO pins to each processor domain at boot time. This new approach is flexible, cost-effective, and easy to use because readily programmable in software.

Multiple DMA blocks may be included and assigned to each processor. In one embodiment, a single DMA block with channel virtualization may be included. The present configuration supports flexible DMA channel assignments to processors at boot time. The integration on a system-on-chip (SoC) architecture ensures that corresponding channel control and error circuitry is placed within a unique peripheral slot. In addition, each DMA interrupt is routed to a unique interrupt vector controlled by the assigned processor. GPIO pins are also included but complemented by input/output (IO) virtualization. IO virtualization supports mapping of the GPIO configuration and control circuitry to a unique virtualization element and placement of each virtualization element within a unique peripheral slot. In this manner, memory ranges, on-chip peripherals, DMA channels and GPIO virtual pin groups are protected for exclusive use by an assigned processor and therefore cannot be interfered by other hardware resources or processors.

Figure 1:
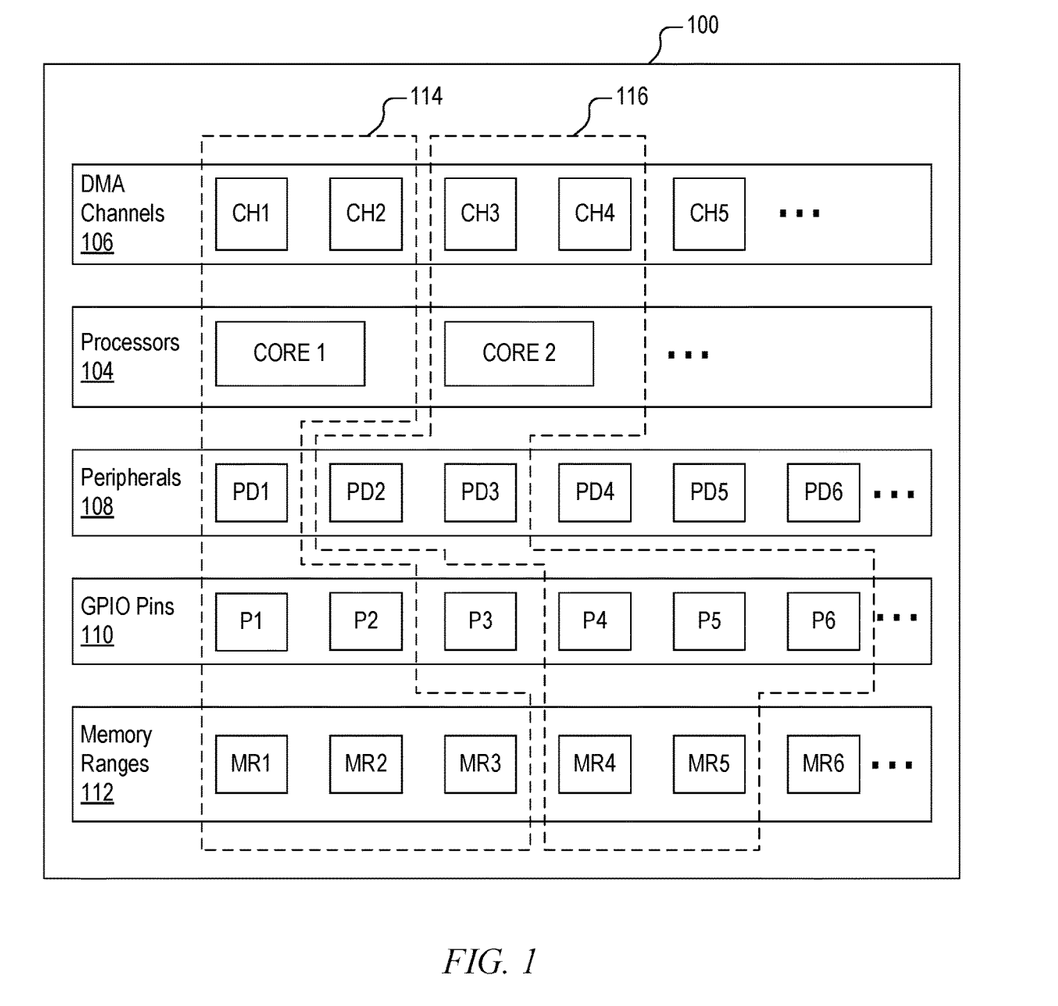
FIG. 1 is a simplified block diagram of a processing system implemented according to one embodiment of the present disclosure.

FIG. 1 is a simplified block diagram of a processing system 100 implemented according to one embodiment of the present disclosure. The processing system 100 may be implemented as an SoC architecture on an integrated circuit (IC) or semiconductor device or the like. The processing system 100 includes multiple processors 104 in which each processor may be any type of processing device, core, central processing unit (CPU), etc. In the illustrated embodiment, the processors 104 are individually shown as CORE 1, CORE 2, etc., as the individual processing cores of an SoC system or the like. Although only two processors 104 are shown, it is understood that any suitable number of processors may be included. The processing system 100 includes multiple direct memory access (DMA) channels 106 individually shown as CH1, CH2, CH3, etc. Although 5 DMA channels 106 are shown, it is understood that any suitable number more or less than 5 channels may be included. The processing system 100 includes multiple peripheral devices 108 individually shown as PD1, PD2, PD3, etc. Although 6 peripheral devices 108 are shown, it is understood that any suitable number more or less than 6 peripheral devices may be included. The processing system 100 includes multiple general-purpose input/output (GPIO)

pins 110 individually shown as P1, P2, P3, etc. Although 6 GPIO pins are shown, it is understood that any suitable number more or less than 6 GPIO pins may be included.

The processing system 100 also includes multiple memory ranges 112 individually shown as MR1, MR2, MR3, etc. Although 6 memory ranges are shown, it is understood that any suitable number more or less than 6 memory ranges may be included. It is noted that in one embodiment, each of the memory ranges 112 may be implemented as separate memory device each mapped into a corresponding separate address range or address space of the processors 104. Alternatively, each of the memory ranges 112 may represent part of the addressable memory space of a corresponding memory device. For example, MR1 may include all or part of the addressable range of a first memory device, MR2 may include all or part of the addressable range of the first memory device or a second memory device, etc. In other words, MR1 and MR2 may be implemented on the same memory device or different memory devices. Each memory device may represent multiple memory devices of a common memory type, such as any type of read-only memory (ROM), random-access memory (RAM) which may include any type of static RAM (SRAM) or dynamic RAM (DRAM) or the like, flash memory devices including program Flash (pFlash) or data Flash (dFlash), etc.

Each of the processors 104 may be assigned to a different domain which may include any one or more of the DMA channels 106, any one or more of the peripheral devices 108, any one or more of the GPIO pins 110, and any one or more of the memory ranges 112. As shown, for example, the first processor CORE 1 is assigned to a first domain 114, which further includes DMA channels CH1 and CH2, peripheral device PD1, GPIO pins P1 and P2, and memory ranges MR1, MR2 and MR3. The second processor CORE 2 is assigned to a second domain 116, which further includes DMA channels CH3 and CH4, peripheral devices PD2 and PD3, GPIO pins P4, P5, and P6, and memory ranges MR4 and MR5. Additional domains may be defined for additional processors. The first processor CORE 1 does not have access to the hardware resources assigned to the second domain 116, and the second processor CORE 2 does not have access to the hardware resources assigned to the first domain 114. Additionally, as more processors are added, such as a third processor CORE 3 (not shown in FIG. 1, but see FIG. 6), the additional processors do not have access to hardware resources within the first domain 114 assigned to CORE 1 or within the second domain 116 assigned to CORE 2.

It is appreciated that a hardware resource protection scheme as described herein provides protection of hardware resources including peripheral devices, DMA channels, GPIO pins, and possibly other hardware resources at boot time as described herein and driven by software. The memory resources may also be protected including memory ranges assigned to processors for exclusive use. The present disclosure uses domains and corresponding domain identifiers (DIDs) for assigning hardware and memory resources to particular processors, although it is understood that any other type of identifier may be used, such as processor identifiers (PIDs) or the like.

Figure 2:
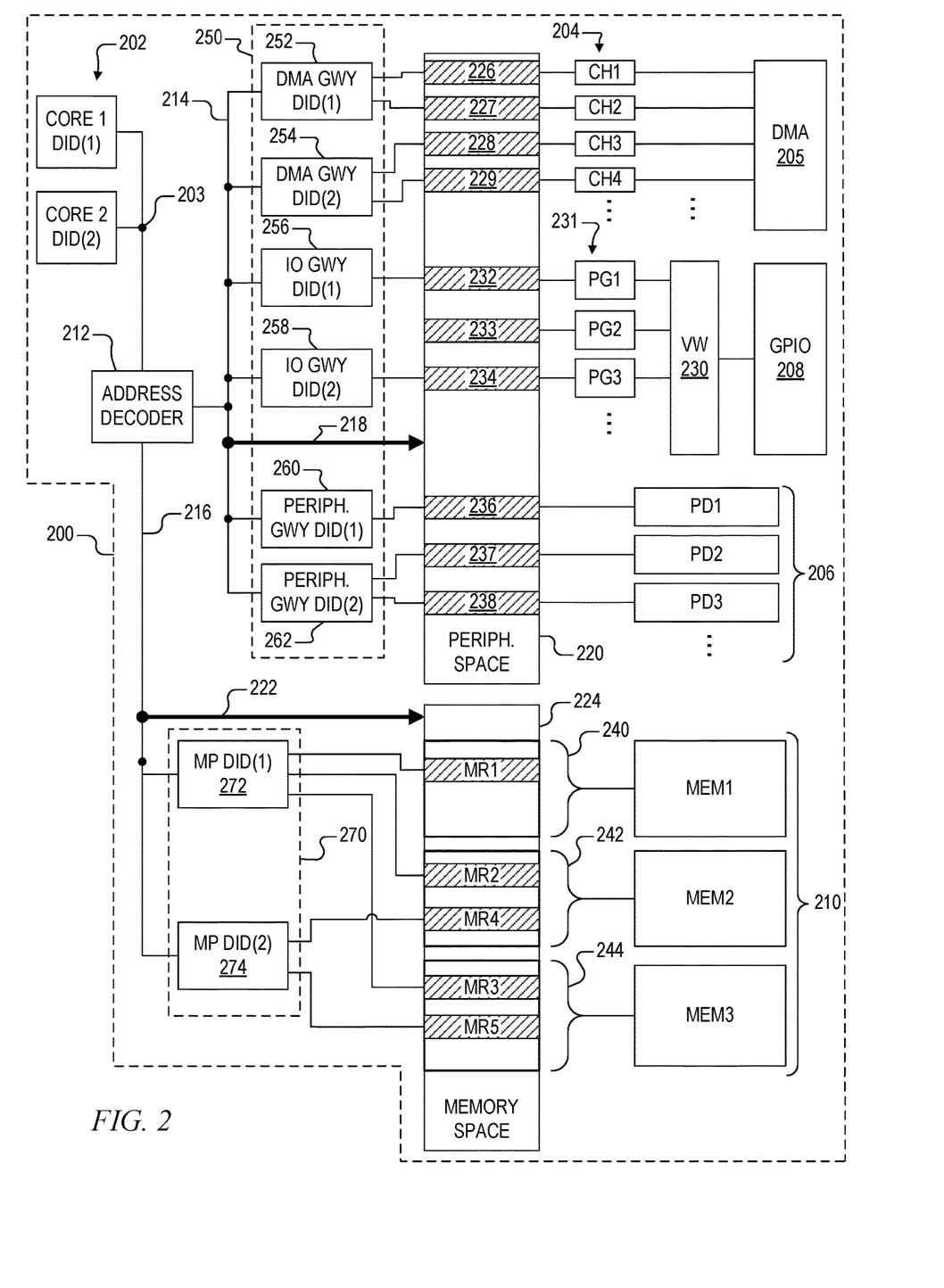
FIG. 2 is a simplified block diagram of a processing system including a hardware protection system implemented according to a more specific embodiment of the present disclosure.

FIG. 2 is a simplified block diagram of a processing system 200 including a hardware protection system implemented according to a more specific embodiment of the present disclosure. The processing system 200 includes multiple processors 202 including a first processor CORE 1 and a second processor CORE 2, in which it is understood that any number of processors may be included in a given configuration. The processors 202 are coupled to a processor bus 203 for ultimately communicating with hardware resources and memory resources. The processor bus 203 is shown in simplified form and may include separate buses for each processor any may be implemented in alternative forms, such as a crossbar configuration or the like. The processing system 200 includes hardware resources including the DMA channels 204, peripheral devices 206, and the GPIO pins 208. In one embodiment, the DMA channels 204 may be implemented by a single DMA device 205, although multiple DMA devices are also contemplated. The resources may further include memory resources for implementing the memory ranges 112, including, for example, MR1, MR2, MR3, MR4, MR5, etc. The memory resources may be implemented by one or more memory devices 210, individually shown as MEM1, MEM2, and MEM3.

The processor bus 203 is coupled to an address decoder 212, which translates processor addresses to hardware resource addresses provided either on a hardware resource bus 214 and memory resource addresses provided on a memory bus 216. An arrow 218 indicates that any of the processors 202 may provide addresses for an entire peripheral space 220 for addressing any of the hardware resources. Another arrow 222 indicates that any of the processors 202 may provide addresses for an entire memory space 224. The hardware resource bus 214 is shown in simplified form and may include separate buses for addressing hardware resources via the peripheral space 220. Likewise, the memory bus 216 is shown in simplified form and may include separate buses for accessing the memory devices 210 via the memory space 224.

The peripheral space 220 may be divided into separate unique peripheral slots for accessing individual hardware resources. Each peripheral slot is defined as an address range within the peripheral space 220. Each DMA channel 204 may be placed into a unique peripheral slot along with corresponding control and error circuitry associated therewith. As shown, DMA channel CH1 is placed into a peripheral slot 226, DMA channel CH2 is placed into a peripheral slot 227, DMA channel CH3 is placed into a peripheral slot 228, and the DMA channel 4 is placed into a peripheral slot 229. Additional channels may be provided and placed into corresponding peripheral slots (not shown) in similar manner.

The GPIO pins 208 may each be placed into separate peripheral slots in similar manner. In one embodiment, one or more pins may be grouped together into separate virtualization elements or virtual pin groups 231 by a virtualization wrapper (VW) 230, in which each of the virtual pin groups 231 is then placed into a separate and unique peripheral slot along with any corresponding configuration and control circuitry. Each virtual pin group 231 includes a subset of the GPIO pins including one or more GPIO pins. Also, each virtual pin group 231 may be associated with a corresponding GPIO device or the like (not shown). As shown, the VW 230 develops a first virtual pin group PG1 placed into a peripheral slot 232, a second virtual pin group PG2 placed into a peripheral slot 233, and a third virtual pin group PG3 placed into a peripheral slot 234. Additional virtual pin groups may be defined and placed into corresponding peripheral slots (not shown) in a similar manner. In comparison with the processing system 100, the virtual pin group PG1 may include GPIO pins P1, P2, and P3, the virtual pin group PG2 may include GPIO pin P3, and the virtual pin group PG3 may include GPIO pins P4, P5, and P6.

The peripheral devices 206 may each be placed into separate peripheral slots in similar manner. As shown, a first peripheral device PD1 is placed into a peripheral slot 236, a second peripheral device PD2 is placed into a peripheral slot 237, and a third peripheral device PD3 is placed into a peripheral slot 238. Additional peripheral devices may be placed into corresponding peripheral slots (not shown) in a similar manner.

Each memory device 210 may implement a separate memory subspace within the overall memory space 224. As shown, for example, the memory device MEM1 is located within a first memory subspace 240, the memory device MEM2 is located within a second memory subspace 242, and the memory device MEM3 is located within a third memory subspace 244. Although not shown, any number of memory devices may be included for implementing different memory spaces. Multiple memory ranges may be defined within corresponding memory subspaces. As shown, a memory range MR1 is defined within the memory subspace 240 of the memory device MEM1, the memory ranges MR2 and MR4 are defined within the memory subspace 242 of the memory device MEM2, and the memory ranges MR3 and MR5 are defined within the memory subspace 244 of the memory device MEM3. It is appreciated that these memory range definitions are arbitrarily chosen for purposes of illustration, in which any number of memory ranges may be defined, in which each memory range may have any suitable size, and in which each defined memory range may be located anywhere within the definable memory space 224.

As noted above, any of the processors 202 may provide addresses in an attempt to access any of the hardware resources located within the peripheral space 220 or any of the memory devices 210 located in the memory space 224. For example, the virtual pin group PG2 is not further protected or isolated so that any of the processors 202, such as either CORE 1 or CORE 2, may access PG2 (unless protected by another processor not shown). Also, memory locations of the memory devices MEM1, MEM2, and MEM3 outside of the predefined memory ranges are not further protected or isolated so that any processor, such as either CORE 1 or CORE 2, may access these memory locations. Each of the processors 202 may be placed into one of multiple domains. For example, CORE 1 may be placed into a first domain having a domain identifier DID(1), and CORE 2 may be placed into a second domain having a domain identifier DID(2).

The processing system 200 may further include gateway (GWY) circuitry 250 for assigning any of the hardware resources to a particular domain. A gateway protection circuit 252 is assigned to the first domain by being programmed with the domain identifier DID(1) for protecting DMA channels CH1 and CH2 placed into peripheral slots 226 and 227, respectively. In this manner, only CORE 1 may access the DMA channels CH1 and CH2. For example, when CORE 1 accesses the DMA channels CH1 and CH2, it provides its domain identifier DID(1) which is intercepted by the gateway protection circuit 252. The gateway protection circuit 252 compares the received domain identifier DID(1) with its programmed domain identifier DID(1) to determine whether to allow access. Since the domain identifiers match, CORE 1 is allowed access to the DMA channels CH1 and CH2. On the other hand, if CORE 2 improperly attempts to access the DMA channels CH1 and CH2 using its domain identifier DID(2), the access is denied by the gateway protection circuit 252. Since the domain identifiers do not match, CORE 2 is prevented from accessing DMA channels CH1 and CH2. In addition, the gateway protection circuit 252 may send an error response to CORE 2 to notify CORE 2 of faulty access. Additional processors, if any, are also denied access to DMA channels CH1 and CH2 and error responses may also be sent in similar manner.

Another gateway protection circuit 254 is assigned to the second domain by being programmed with the domain identifier DID(2) for protecting DMA channels CH3 and CH4 placed into peripheral slots 228 and 229, respectively. In this manner, only CORE 2 may access the DMA channel CH3 by providing the matching domain identifier DID(2). If CORE 1 attempts to access either of the DMA channels CH3 and CH4, it provides its domain identifier DID(1) which is denied by the gateway protection circuit 254. Since the domain identifiers do not match, CORE 1 is prevented from accessing DMA channels CH3 and CH4. In addition, the gateway protection circuit 254 may send an error response to CORE 1 to notify CORE 1 of faulty access. Additional processors, if any, are also denied access to DMA channels CH3 and CH4 and error responses may also be sent in similar manner.

Another gateway protection circuit 256 is assigned to the first domain by being programmed with the domain identifier DID(1) for protecting the virtual pin group PG1 placed into peripheral slot 232, and yet another gateway protection circuit 258 is assigned to the second domain by being programmed with the domain identifier DID(2) for protecting the virtual pin group PG3 placed into peripheral slot 234. In this manner, only CORE 1 may access PG1 while CORE 2 is prevented from accessing PG1, and only CORE 2 may access PG3 while CORE 1 is prevented from accessing PG3. In a similar manner as previously described, if CORE 1 attempts to access PG3 or if CORE 2 attempts to access PG1, an error response may be sent to the processor attempting unauthorized (e.g., unassigned) access. Additional processors, if any, are prevented from accessing PD1 or PD3 in similar manner.

In addition, another gateway protection circuit 260 is assigned to the first domain by being programmed with the domain identifier DID(1) for protecting the peripheral device PD1 placed into the peripheral slot 236. Thus, only CORE 1 may access the peripheral device PD1 whereas CORE 2 is prevented from accessing the peripheral device PD1. Similarly, another gateway protection circuit 262 is assigned to the second domain by being programmed with the domain identifier DID(2) for protecting the peripheral devices PD2 and PD3 placed into the peripheral slots 237 and 238, respectively. Thus, only CORE 2 may access the peripheral devices PD2 and PD3 while CORE 1 is prevented from accessing the peripheral devices PD2 or PD3. Again and as previously described, additional processors, if any, are prevented from accessing the peripheral devices PD1, PD2, and PD3 and an error response may be sent to any processor attempting unauthorized (e.g., unassigned) access.

The processing system 200 may further include memory protection circuitry 270 for defining the locations and sizes of the memory ranges and for assigning each memory range to a particular domain. As shown, memory protection (MP) circuits 272 and 274 are provided to protect memory ranges MR1-MR5 for the corresponding domains. MP circuit 272 is programmed with domain identifier DID(1) for access of memory ranges MR1, MR2, and MR3 by CORE 1 only, and MP circuit 274 is programmed with domain identifier DID(2) for access of memory ranges MR4 and MR5 by CORE 2 only. Again and as previously described, additional processors, if any, are prevented from accessing any of the memory ranges MR1-MR5 and an error response may be sent to any processor attempting unauthorized (e.g., unassigned) access.

The particular domain and corresponding hardware and memory resource assignments illustrated in FIG. 2 are arbitrarily determined for purposes of illustration only. It is understood that any of the processors 202 may be assigned to any particular domain and each of gateway circuits of the gateway circuitry 250 and each of the MP circuits of the memory protection circuitry 270 may be programmed for any of the domains. It is noted that the information about assignment of hardware and memory resources to corresponding processors may already be known at application build time. Thus, this information can be transferred to the processing system 200 as a part of executable code, such as an elf file or an s-record file that is programmed into flash memory or the like on the customer production line. The assignment information may reside, for example, in the form of an assignment table or the like stored in flash memory or the like. A flash memory, for example, may be internal or embedded, or may be externally provided, such as interfaced via Quad-SPI (Serial Peripheral Interface with 4-bit data bus) or the like.

In one embodiment, one of the processors 202, such as CORE 1, is identified as a boot processor which is the first booting processor. The assignment table from memory is read by the boot processor which uses values from the assignment table to set control registers of all listed protection circuits. In one embodiment, the resource assignments may be done by the boot processor before other application processors are initiated for operation. After the protection resources are programmed and resources to all processors are defined and assigned, then the boot processor may lock the setting meaning that the assignment settings of protection elements cannot be changed until next device reset. After locking resources, the boot processor starts the remaining processors to operate. The remaining processors can only use hardware and memory resources that they were assigned during bootup by the boot processor. Any attempt by one processor to access resources assigned to another processor may cause the processor attempting the faulty access to receive an error response or enter an exception while the other processors can still operate without impact.

It is noted that the gateway circuitry 250 may be implemented in other ways. For example, one gateway protection circuit 252 is shown for protecting DMA channels for one domain and gateway protection circuit 254 is shown for protecting DMA channels for another domain, such that a separate gateway protection circuit may be provided for each processor 202 or for each domain. In an alternative embodiment, a single gateway protection circuit may be provided and programmed with corresponding domain identifiers for assigning each DMA channel to a corresponding one of multiple domains. In addition, although separate gateway protection circuits are shown provided for protection IO peripheral resources and peripheral devices, a single gateway protection circuit may be provided for protecting hardware resources of a given domain. In a similar manner, although the memory protection circuitry 270 is shown including separate MP circuits provided for each domain, the memory protection circuitry 270 may either be separated by memory device or may be combined and programmed in any suitable manner for assigning any defined memory range of any memory device to any domain.

Although not specifically shown in FIG. 2, the hardware resource assignments further ensure that the control and error circuitry associated with each DMA channel is also placed into the same peripheral slot as the DMA channel. Thus, the control and error circuitry associated with DMA channel CH1 is placed within the peripheral slot 226, the control and error circuitry associated with DMA channel CH2 is placed within the peripheral slot 227, and so on. In addition, as further described herein below, each of the channel transfer and error interrupts of each of the DMA channels 204, and any interrupts associated with each of the peripheral devices 206, are also routed to unique interrupt vectors associated with the assigned processor.

Also, although not specifically shown in FIG. 2, the hardware resource assignments further ensure that the mapping of GPIO configuration and control circuitry of each of the virtual pin groups 231 is placed into the same peripheral slot as the virtual pin group. Each of the GPIO pins, for example can operate in one or more of various operating modes, such as input or output, open drain, etc. Thus, the GPIO configuration and control circuitry of virtual pin group PG1 is placed into the peripheral slot 232, the GPIO configuration and control circuitry of virtual pin group PG3 is placed into the peripheral slot 234, etc. In this manner, the assigned processor not only has exclusive write access to each GPIO pin of a corresponding virtual pin group to set pin state (e.g., to log. 1 or log. 0), but it may further change configuration and operation of each of the pins within the virtual pin group.

In one embodiment, the DMA channels 204 and the peripheral devices 206 are placed into corresponding peripheral slots during manufacture of the processing system 200. At power on or reset (POR), the processors 202 are assigned DIDs, and the gateway circuitry 250 including the gateway protection circuits 252, 254, 256, 258, 260, and 262 are programmed with corresponding DIDs to assign each of these hardware resources to corresponding processors. In one embodiment, upon POR the virtual pin groups 231 are defined and placed into available peripheral slots and the gateway protection circuits 256 and 258 are programmed with corresponding DIDs to assign each of these hardware resources to corresponding processors. In one embodiment, upon POR, the memory ranges MR1-MRx (in which "x" denotes a total number of memory ranges) are defined and the memory protection circuitry 270 is programmed with corresponding DIDs to assign each of these memory ranges to corresponding processors.

Figure 3:
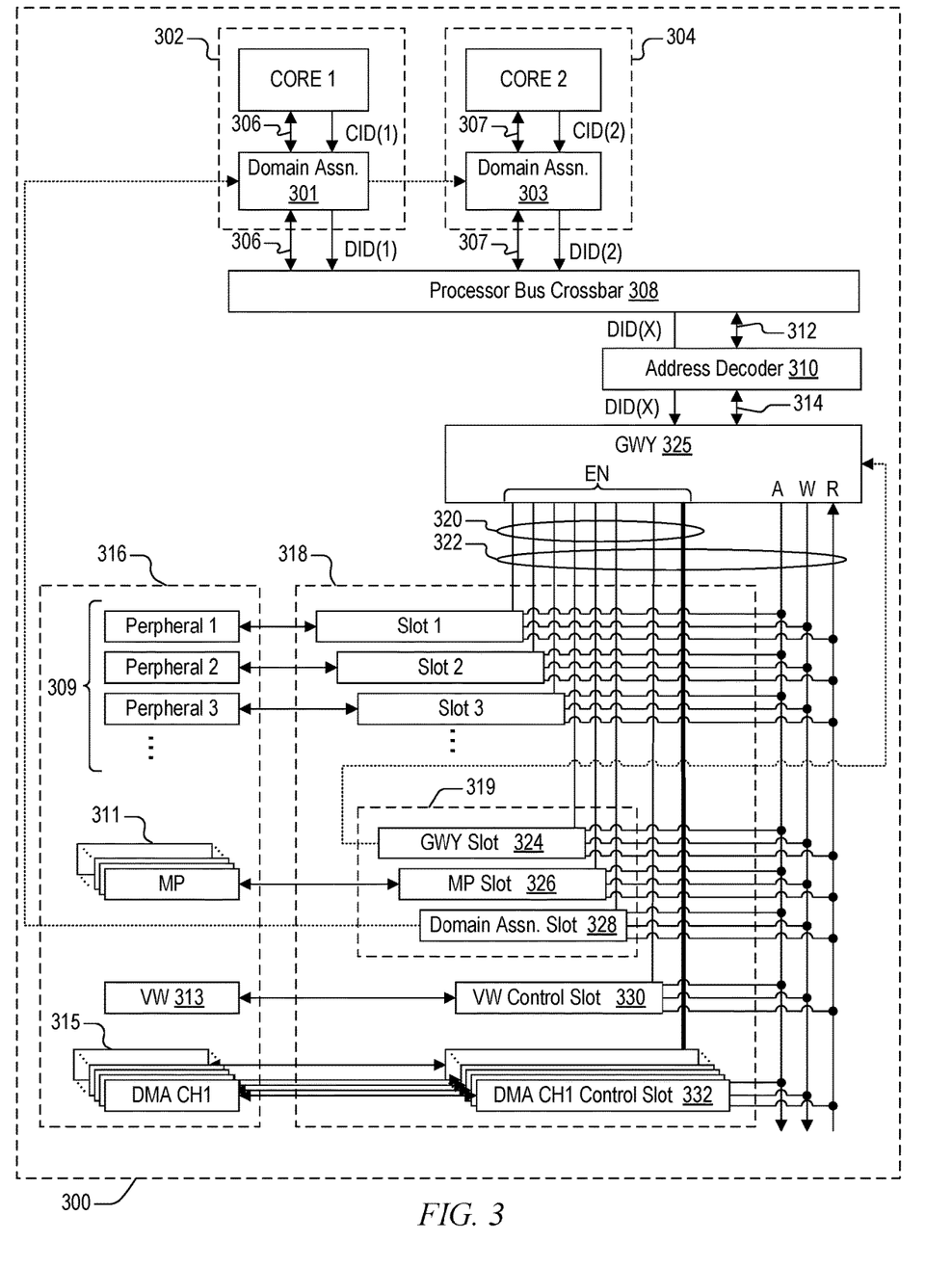
FIG. 3 is a simplified block diagram of the processing system including a hardware protection system for the hardware resources implemented according to another embodiment of the present disclosure.

FIG. 3 is a simplified block diagram of the processing system 300 including a hardware protection system for the hardware resources implemented according to another embodiment of the present disclosure. A first processor, shown as CORE 1, is assigned with a domain identifier DID(1) by domain assignment circuitry 301 to place CORE 1 within a first domain 302, and a second processor, shown as CORE 2, is assigned a domain identifier DID(2) by domain assignment circuitry 303 to place CORE 2 within a second domain 304. CORE 1 communicates via processor bus 306 and a corresponding processor bus crossbar 308 to an address decoder 310 via a processor bus 312 for interfacing the hardware resources of the processing system 300. CORE 2 communicates via processor bus 307, the processor bus crossbar 308, and the processor bus 312 to the address decoder 310 for interfacing the hardware resources of the processing system 300. In one embodiment, CORE 1 communicates using a core identifier CID(1) and the domain assignment circuitry 301 adds the domain identifier DID(1) to each access of CORE 1, and CORE 2 communicates using a core identifier CID(2) and the domain assignment circuitry 303 adds the domain identifier DID(2) to each access of CORE 2. The domain identifier of the processor attempting access is provided to the address decoder 310, which is shown as DID(X) representing either DID(1) for CORE 1 or DID(2) for CORE 2 or any other domain identifier for any other included processors.

The address decoder 310 interfaces a set of peripherals 316 placed into a corresponding set of peripheral slots 318 via a hardware resource bus 314 and a peripheral bus 322 which includes a set of peripheral enable signals 320. Gateway circuitry 325 is interposed between the hardware resource bus 314 and the peripheral bus 322 for controlling access as further described herein. Each enable signal is provided to a corresponding one of the peripheral slots to enable the corresponding peripheral 316 when being accessed by a processor. The peripheral bus 322 also includes address, read, and write lines to enable the processor to communicate with the accessed peripheral. The peripherals 316 generally represent any of the hardware resources previously described, which may include peripheral devices 309, a virtualization wrapper (VW) 313 for defining virtual pin groups of GPIO pins, DMA channels 315, etc. The peripherals 316 may also include memory protection (MP) circuitry 311. The peripheral slots 318 are defined within a peripheral address space similar to the peripheral space 220 of the processing system 200 previously described.

In the illustrated embodiment, the peripheral slots 318 include at least one peripheral slot for each of the peripheral devices 309. Another set of peripheral slots 318 may be referred to as protection control slots 319 including a gateway peripheral slot 324, a memory protection peripheral slot 326, and a domain assignment peripheral slot 328. The gateway peripheral slot 324 may be used for placing gateway circuitry 325 as a peripheral interposed between the address decoder 310 (via the hardware peripheral bus 314) and the peripheral slots 318 during chip development of the processing system 300. The gateway circuitry 325 may be configured during chip development to control one or more (up to all) of the peripheral slots 318 and the peripheral bus 322 including the peripheral enable signals 320. The memory protection peripheral slot 326 is used to configure the MP circuitry 311 to assign subspaces located within the memory devices. The domain assignment peripheral slot 328 is used to configure the domain assignment circuitry 301 and 303 to program the domain identifiers of the processors. A VW control peripheral slot 330 is used with the VW circuitry 313 to group GPIO pins into virtual pin groups. A set of DMA channel control slots 332 are used to access DMA control circuitry used to configure the DMA channels 315 to transfer data on behalf of the processor's domain identifier the configured operation of the specific DMA channel. It is noted that the DID(X) of the accessing processor is provided to the DMA control circuitry via the DMA channel control slots 332.

Upon POR at bootup or startup, the gateway circuitry 325 is programmed with one or more DIDs with corresponding ones (up to all) of the peripheral slots 318 associated with each DID. Each of the processors of the processing system 300, including CORE 1 and CORE 2, attempts to access a selected one of the peripherals 316 by providing a corresponding peripheral address and type of transaction (e.g., read or write) along with its domain identifier DID (e.g., DID(1) from CORE 1 or DID(2) from CORE 2). The address decoder 310 asserts a corresponding one of the peripheral enable signals 320 and controls or asserts the peripheral bus 322 to interface the processor to the addressed peripheral. The gateway circuitry 325 either allows or denies access by either passing or blocking the individual signals of the peripheral bus 322.

If access is allowed, then the processor accesses the addressed peripheral to complete the transaction. For example, the address decoder 310 decodes the provided address from a processor into a corresponding slot address for accessing the corresponding one of the peripherals 316. The address decoder 310 asserts a corresponding peripheral enable signal to enable the addressed peripheral and asserts the decoded slot address on the peripheral bus 322. The read or write transaction may then be performed on the peripheral bus 322. If access is blocked, such as when the processor is not assigned to the particular peripheral that it is attempting to access (e.g., does not provide the correct DID that is assigned to the peripheral being addressed), then the gateway circuitry 325 may provide a corresponding error response to the processor for taking corrective action such as entering an exception or the like.

Figure 4:
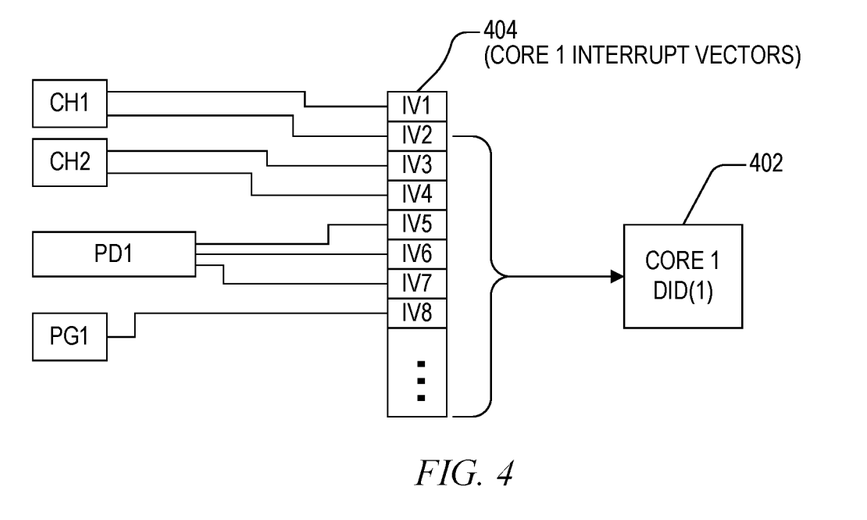
FIG. 4 is a simplified block diagram illustrating routing of interrupts to interrupt vectors of an assigned processor, shown as CORE 1, according to one embodiment of the present disclosure.

FIG. 4 is a simplified block diagram illustrating routing of interrupts to interrupt vectors of an assigned processor 402, shown as CORE 1, according to one embodiment of the present disclosure. The processor 402 includes a set of interrupt vectors (IV) 404, individually shown as interrupt vectors IV1, IV2, IV3, IV4, IV5, IV6, IV7, IV8, etc. As previously stated, each of the channel transfer and error interrupts of each of the DMA channels, and any interrupts associated with each of the peripheral devices, are also routed to unique interrupt vectors associated with the assigned processor. As shown, DMA channels CH1 and CH2 have 2 interrupts each which are routed to respective interrupt vectors of the set of interrupt vectors 404. The interrupts associated with DMA channel CH1, such as the 2 interrupts as shown, are routed to interrupt vectors IV1 and IV2. Similarly, the interrupts associated with DMA channel CH2, such as the 2 interrupts as shown, are routed to interrupt vectors IV3 and IV4. Similarly, 3 interrupts associated with the peripheral device PD1 are routed to interrupt vectors IV5, IV6, and IV7, respectively, of the set of interrupt vectors 404 of the processor 402. Similarly, an interrupt associated with virtual pin group PG1 is routed to interrupt vector IV8. In this manner, the processor assigned to hardware resources may perform routines for handling interrupts initiated by those assigned hardware resources.

Figure 5:
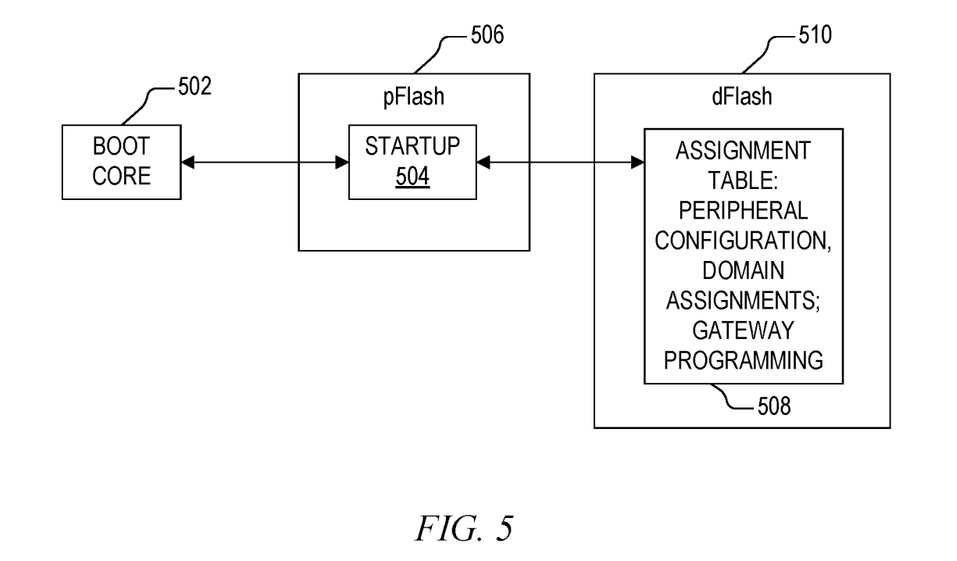
FIG. 5 is a simplified block diagram of a startup or boot configuration for peripheral configuration and gateway programming according to one embodiment of the present disclosure.

FIG. 5 is a simplified block diagram of a startup or boot configuration for peripheral configuration and gateway programming according to one embodiment of the present disclosure. A processor 502, shown as a BOOT CORE, performs a startup or bootup process upon POR of a processing system, such as any of processing systems 100, 200, or 300. The startup routine 504 is located in memory, such as a program flash (pFlash) memory 506. During the startup process, the processor 502 accesses and executes the startup routine 504, which in turn accesses peripheral configuration and gateway programming information also stored in memory, such as listed within an assignment table 508 stored in a data flash (dFlash) memory 510. The boot processor 502 uses information from the assignment table 508 to program protection elements before any other processors in the multiprocessor system begin to operate. Once the domain and hardware resource assignments are completed, the boot processor 502 may lock the configuration to prevent other processors from altering the programmed configuration until next POR.

It is noted that the information about assignment of hardware and memory resources to corresponding processors of the processing system may already be known at application build time. Thus, this information can be transferred to the processing system as a part of executable code, such as an elf file or an s-record file that is programmed into flash memory or the like on the customer production line. The assignment information may reside, for example, in the form of the assignment table 508 or the like stored in flash memory, such as the dFlash memory 510.

In an alternative embodiment, each of the processors may perform hardware resource assignments. For example, the first boot processor, such as CORE 1, assigns itself a domain and corresponding hardware resources it needs, locks its configuration, and then passes control to a next processor, such as CORE 2, to assign itself a domain and corresponding hardware resources it needs from among remaining resources, and so on.

Figure 6:
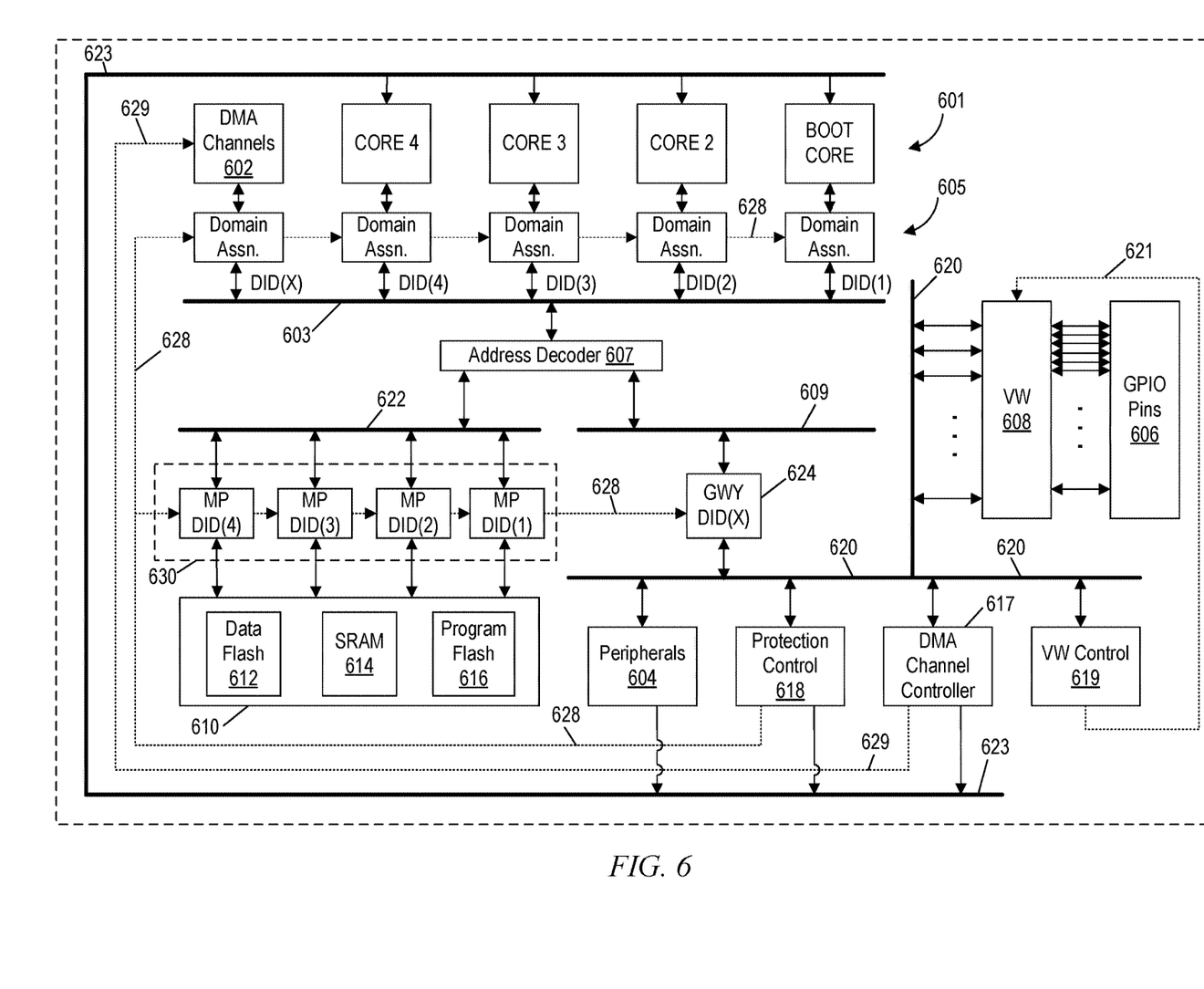
FIG. 6 is a simplified block diagram of a processing system implemented according to another embodiment of the present disclosure.

FIG. 6 is a simplified block diagram of a processing system 600 implemented according to another embodiment of the present disclosure. The processing system 600 includes multiple processors 601 (e.g., 4 processors) including BOOT CORE (or CORE 1), CORE 2, CORE 3, and CORE 4, multiple DMA channels 602, multiple peripheral devices 604, multiple GPIO pins 606, a virtualization wrapper 608, multiple memory devices 610 including, for example, a data Flash memory 612, a static RAM (SRAM) 614, and a program Flash memory 616, a protection controller 618, gateway (GWY) circuitry 624 including multiple gateway circuits, and multiple memory protection (MP) circuitry 630. Although not shown, external memory and peripheral devices may be included as well.

The processors 601 and the DMA channels 602 interface a processor bus 603 via corresponding domain assignment circuitry 605. The domain assignment circuitry 605 adds a domain identifier for each access by a corresponding processor, shown as DID(1) for the BOOT CORE, DID(2) for CORE 2, DID(3) for CORE 3, and DID(4) for CORE 4. The domain assignment circuitry 605 adds a domain identifier shown as DID(X) for each transfer performed by the DMA channels that correspond to a domain identifier of the processor that configured the respective DMA channel. An address decoder 607 interfaces the processor bus 603 to a hardware resource bus 609 and a memory bus 622. The gateway circuitry 624 interfaces the hardware resource bus 609 to a peripheral bus 620, which provides access to the peripherals 604, the virtual pin groups defined by the virtualization wrapper (VW) 608, the protection controller 618, DMA channel controller 617, and a VW controller 619.

The protection controller 618 manages access control, domain assignment, system memory protection, and peripheral isolation for allowing software to assign chip resources (cores, non-core bus masters, memory regions and slave peripherals) to separated partitions or domains. The domains may enable a defined access control policy for each of multiple privilege levels. A protection control bus 628 is shown coupled between the gateway circuitry 624, the domain assignment circuitry 605, and the MP circuitry 630 for enabling programming of these circuits during setup and configuration of the hardware and memory resources as described herein. A DMA control bus 629 enables programming control of the DMA channels by the DMA channel controller 617. A VW control bus 621 enables programming by the VW controller 619 of the virtual pin groups of the virtualization wrapper 608. A set of interrupt signals 623 are shown routed between the peripherals 604, the protection controller 618, and the DMA channel controller 617 to the processors 601.

Upon POR, the BOOT CORE accesses and executes a startup routine (e.g., startup routine 504) from one of the memory devices 610, such as the program Flash memory 616, which further accesses an assignment table (e.g., assignment table 508) stored in one of the memory devices 610, such as the data Flash memory 612, for configuring the system. During the boot or startup routine, the boot processor assigns one or more of the processors (e.g., CORE 1-4) to one or more domains with corresponding DIDs. The BOOT CORE defines memory ranges of the memory devices 610 and assigns the memory ranges to corresponding domains and processors and programs the MP circuitry 630 accordingly. The BOOT CORE programs the gateway circuitry 624 to assign DMA channels 602 and corresponding control and error circuitry to domains and corresponding processors. The BOOT CORE also programs the MP circuitry 630 to enable the DMA channels 602 in accessing the memory devices 610 according to domain assignments, e.g., DID(1), DID(2), DID(3), and DID(4). The BOOT CORE interfaces the virtualization wrapper 608 to define the virtual pin groups of the GPIO pins 606 in a similar manner previously described, and further programs the gateway circuitry 624 to assign the virtual pin groups along with corresponding configuration and control circuitry to corresponding peripheral slots. The BOOT CORE programs the gateway circuitry 624 to assign peripheral devices 604 and corresponding hardware resources to corresponding domains and processors. The gateway circuitry 624 is further programmed to enable the DMA channels 602 in accessing the peripheral devices 604 according to domain assignments. The BOOT CORE may further route interrupts of the DMA channels, peripheral devices, and virtual pin groups to interrupt vectors of processors assigned to the same domain. Once the domain assignments and corresponding hardware and memory resource assignments are completed, the boot processor may lock the configuration and pass operation to another processor.

Figure 7:
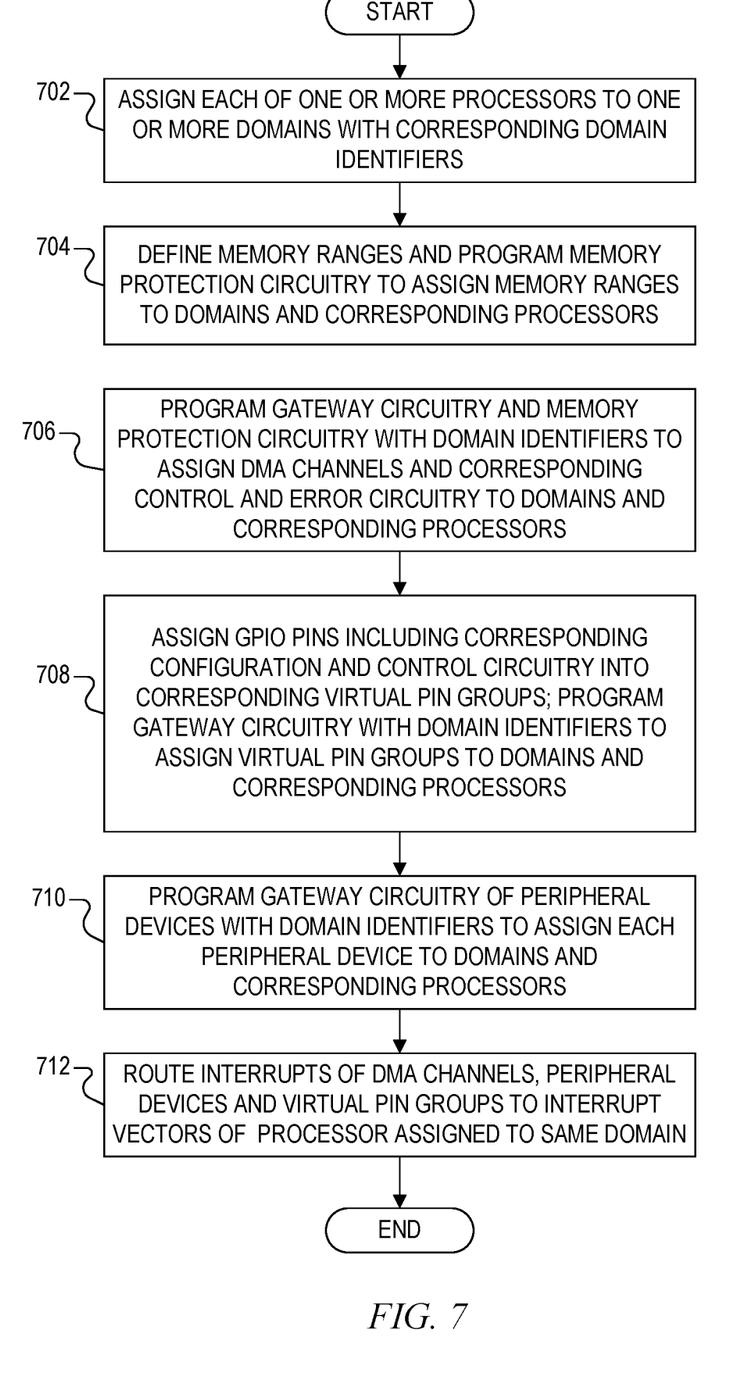
FIG. 7 is a flowchart diagram illustrating a method of limiting access of hardware and memory resources only to assigned domains and corresponding processors according to one embodiment of the present disclosure.

FIG. 7 is a flowchart diagram illustrating a method of limiting access of hardware and memory resources only to assigned domains and corresponding processors according to one embodiment of the present disclosure. Each of the blocks may be performed by a boot core, such as a selected one of the processors of the processing system. At a first block 702, after POR of the system, each of one or more processors is assigned to one or more domains using corresponding domain identifiers or the like. Although multiple processors may be assigned into one domain, usually each domain includes only one processor or core to maximize protection of hardware and memory resources.

At next block 704, memory ranges (e.g., MR1-MRx) of the memory devices (e.g., 210, 610) are defined and memory protection circuitry (e.g., 270, 630) is programmed to assign memory ranges to domains and corresponding processors.

At next block 706, gateway circuitry (e.g., 250, 624) and memory protection circuitry (e.g., 630) are programmed with domain identifiers to assign DMA channels (e.g., 106, 204, 602) and corresponding control and error circuitry to domains and corresponding processors.

At next block 708, GPIO pins (e.g., 110, 208, 606) including corresponding configuration and control circuitry are grouped into corresponding virtual pin groups (e.g., 231) (such as performed using a virtualization wrapper (e.g., 230, 608) or the like), and gateway circuitry (e.g., 624) is programmed with domain identifiers to assign the virtual pin groups to domains and corresponding processors.

At next block 710, gateway circuitry (e.g., 624) of peripheral devices (e.g., 108, 206, 604) are programmed with domain identifiers to assign each peripheral device to domains and corresponding processors.

At next block 712, interrupts of DMA channels, peripheral devices, and virtual pin groups are routed to interrupt vectors of a processor assigned to the same domain, and operation of hardware and memory resource protection is completed.

It is noted that the particular order of assignments and programming shown and described in FIGS. 6 and 7 is not absolute and may be rearranged or reordered in any suitable manner.

A processing system according to one embodiment includes processors, peripheral slots, hardware resources, and gateway circuitry. Each processor is assigned a corresponding identifier. The peripheral slots are located within an addressable peripheral space. Each hardware resource is placed into a corresponding peripheral slot, including at least one direct memory access (DMA) device supporting at least one DMA channel and at least one general-purpose input/output (GPIO) pin. The gateway circuitry is programmed to control access of the hardware resources only by a processor that provides a matching identifier.

A method of limiting access of processors to hardware resources of a multiprocessing system according to one embodiment includes assigning each processor a corresponding identifier, programming gateway circuitry with a first identifier to control access of at least one hardware resource placed into a corresponding peripheral slot, detecting attempted access of a processor to the at least one hardware resource using a second identifier, and controlling access of the hardware device including preventing the access when the first and second identifiers do not match, and allowing the access when the first and second identifiers do match.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processing system, comprising:
a plurality of processors each assigned a corresponding one of a plurality of identifiers;
a plurality of peripheral slots each located within an addressable peripheral space;
a plurality of hardware resources each placed into a corresponding one of the plurality of peripheral slots, wherein the plurality of hardware resources comprises:
at least one direct memory access (DMA) device supporting at least one DMA channel; and
a plurality of general-purpose input/output (GPIO) pins;
gateway circuitry that is programmed to control access of the plurality of hardware resources only by a processor that provides a matching identifier; and
a virtualization wrapper defining a first virtual pin group comprising a subset of the plurality of GPIO pins and configured to place the first virtual pin group into a first peripheral slot, wherein the gateway circuitry is programmed with a first domain identifier of a first processor for controlling access to the first virtual pin group.

2. The processing system of claim 1, wherein the plurality of processors includes a boot core, and wherein the boot core assigns one or more processors a corresponding one of the plurality of identifiers and programs the gateway circuitry with corresponding ones of the plurality of identifiers to control access of each of the plurality of hardware resources by one or more processors providing a matching identifier.

3. The processing system of claim 1, wherein the gateway circuitry is programmed with a first identifier of the first processor for controlling access to a first DMA channel placed in a first peripheral slot.

4. The processing system of claim 3, wherein an interrupt associated with the first DMA channel is routed to an interrupt vector that is mapped to the first processor.

5. The processing system of claim 3, wherein control and error circuitry associated with the first DMA channel is located in the first peripheral slot.

6. The processing system of claim 1, wherein the at least one DMA channel comprises a plurality of DMA channels, wherein the gateway circuitry is programmed with a first identifier of the first processor for controlling access to a first DMA channel placed in a first peripheral slot, and wherein the gateway circuitry is programmed with a second identifier of a second processor for controlling access to a second DMA channel placed in a second peripheral slot.

7. The processing system of claim 6, wherein the gateway circuitry prevents the second processor from accessing the first DMA channel and prevents the first processor from accessing the second DMA channel.

8. The processing system of claim 1, wherein the first virtual pin group comprises corresponding configuration and control circuitry, and wherein the virtualization wrapper is used to place the corresponding configuration and control circuitry into the first peripheral slot.

9. The processing system of claim 1, wherein:
the virtualization wrapper further defines a second virtual pin group comprising a second subset of the plurality of GPIO pins and is further configured to place the second virtual pin group into a second peripheral slot; and
wherein the gateway circuitry is further programmed with a second domain identifier of a second processor for controlling access to the second peripheral slot.

10. The processing system of claim 9, wherein the gateway circuitry prevents the second processor from accessing the first virtual pin group and prevents the first processor from accessing the second virtual pin group.

11. The processing system of claim 1, wherein the plurality of hardware resources further comprises a plurality of peripheral devices that are each placed into a corresponding one of the plurality of peripheral slots, wherein the gateway circuitry is programmed with a first identifier of the first processor for controlling access to a first peripheral device placed in a first peripheral slot, and wherein the gateway circuitry is programmed with a second identifier of a second processor for controlling access to a second peripheral device placed in a second peripheral slot.

12. The processing system of claim 11, wherein the gateway circuitry prevents the second processor from accessing the first peripheral device and prevents the first processor from accessing the second peripheral device.

13. The processing system of claim 1, wherein the gateway circuitry provides an error response to a processor that attempts to access a hardware resource using a nonmatching identifier.

14. The processing system of claim 1, further comprising:
the plurality of hardware resources further comprising a memory device; and
memory protection circuitry that is programmed with at least one identifier in which each programmed identifier is used by the memory protection circuitry to control access of a corresponding defined address range of the memory device.

15. A method of limiting access of processors to hardware resources of a multiprocessing system, comprising:
assigning each of a plurality of processors a corresponding one of a plurality of identifiers;
programming gateway circuitry with a first identifier to control access of at least one hardware resource placed into a corresponding one of a plurality of peripheral slots, wherein the at least one hardware resource comprises a plurality of general-purpose input/output (GPIO) pins;
placing, by a virtualization wrapper, a first virtual pin group into a first peripheral slot, wherein the first virtual pin group comprises a subset of the plurality of GPIO pins;
detecting attempted access of a processor to the first peripheral slot using a second identifier; and
controlling access of the at least one hardware device to the first peripheral slot comprising preventing the access in response to the first and second identifiers not matching, and allowing the access in response to the first and second identifiers matching.

16. The method of claim 15, wherein the programming gateway circuitry comprises programming gateway circuitry with the first identifier to control access of a direct memory access channel placed into the corresponding one of the plurality of peripheral slots.

17. The method of claim 15, wherein the programming gateway circuitry comprises programming gateway circuitry with the first identifier to control access of a peripheral device placed into the corresponding one of the plurality of peripheral slots.

18. The method of claim 15, further comprising providing an error response to the processor attempting access of the at least one hardware resource.

* * * * *